May 27, 1941.  H. STARK  2,243,512
NAVIGATING INSTRUMENT
Filed March 13, 1939
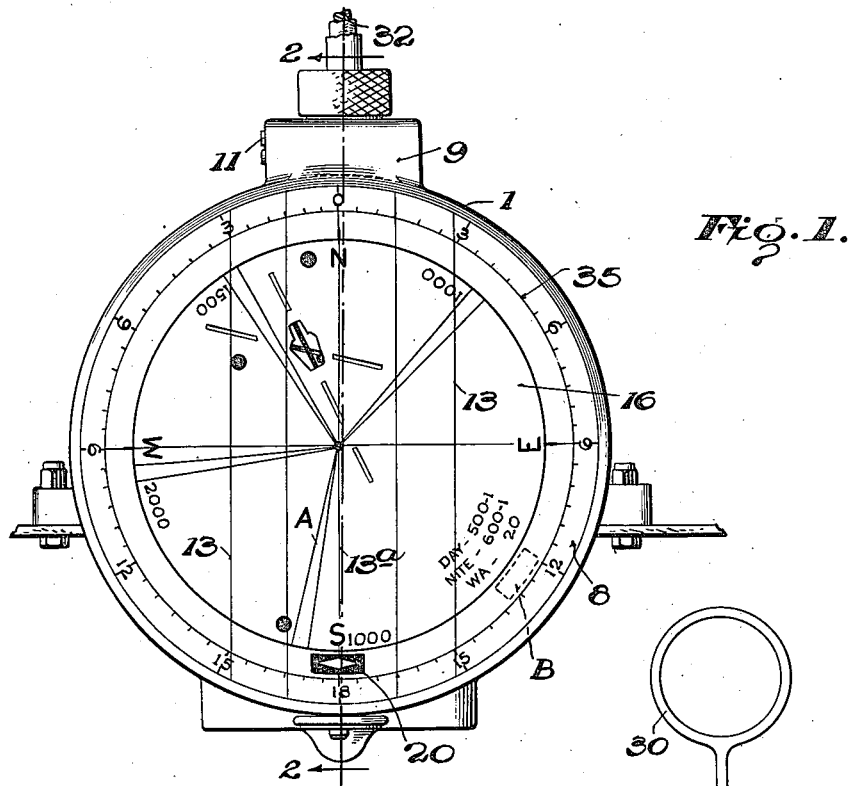
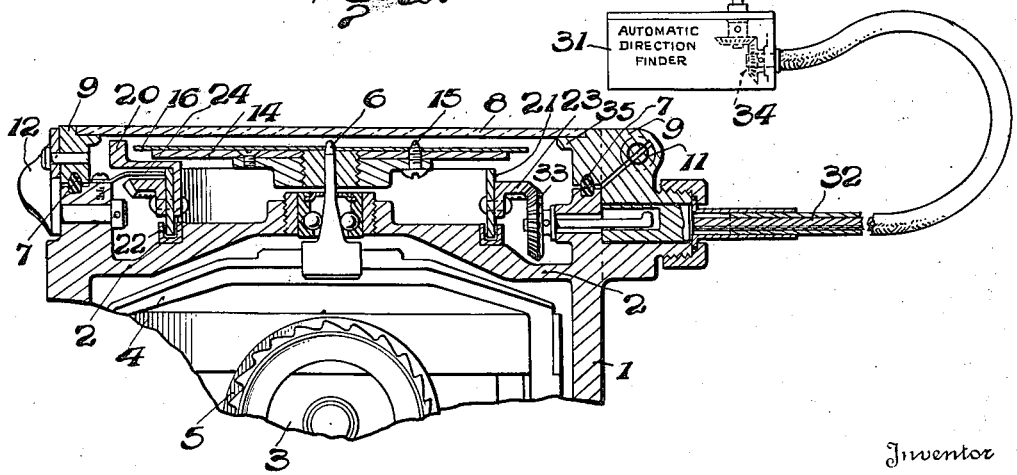
Inventor
Horace Stark
By Samuel Scrivener Jr.
Attorney Patented May 27, 1941

2,243,512

UNITED STATES PATENT OFFICE 2,243,512

NAVIGATING INSTRUMENT

Horace Stark, Detroit, Mich.

Application March 13, 1939, Serial No. 261,670

6 Claims. (Cl. 250—11)

This invention relates broadly to the field or art of instruments which are used to facilitate and guide the navigation of aircraft, vessels and other mobile craft and, more particularly, is intended to provide an improved navigating instrument which will at all times provide an indication of the heading and course of a mobile craft, on which the instrument is carried, with respect to a source of radiations on the surface of the earth.

It is a primary object of the invention to provide a navigating instrument which is particularly adapted for use on aircraft and which combines into a single instrument a representation of the part of the earth's surface which is being traversed and which is constantly maintained in properly oriented position with respect to that part of the earth's surface, representations of the heading of the aircraft over this part of the earth's surface, and a representation of the bearing from the aircraft of a fixed point on the earth's surface, such, for example, as a radio beacon or a radio broadcasting station.

A further object of the invention is to provide a navigating instrument which will produce such a combination of indications that simple corrections may be made for the effects of drift due to crosswinds, whereby an aircraft may be flown over a selected area without deviating from a predetermined course.

A still further object of the invention is to provide in a single instrument the various indications heretofore produced by a number of instruments, whereby indications and information are provided which were not given by the separate instruments when read separately.

Other objects and features of novelty will be apparent from the following description and the annexed drawing, it being clearly understood, however, that the invention is not limited in any way by such description and drawing, or otherwise than by the appended claims.

Referring to the drawing, in which similar reference numerals refer to like parts, Fig. 1 is a plan view of an instrument formed according to the invention, and Fig. 2 is a sectional view of the instrument, with associated operating means forming part of the invention, being partly taken on the line 2—2 of Fig. 1.

It has heretofore been proposed, and is now known, to provide a means, which may be mounted in an aircraft and upon which a map of a part of the earth's surface may be mounted, and which wil maintain such map in a fixed and properly oriented position with respect to the part of the earth's surface which is represented so that, as the aircraft traverses the area represented, the pilot will have before him a constant indication of the orientation of the aircraft with respect to such area. There are also well known to the art at this time devices known as automatic direction finders and which are operable, when mounted on a moving body such as an aircraft, to maintain the directional receiving antenna of the direction finder in a constant position with respect to a source of radiations to which the direction finder is tuned. Thus, if the direction finder is tuned to receive a minimum signal from a broadcasting station or radio beacon the receiving loop will be constantly turned, as the aircraft moves, in such a manner as to keep the plane of the loop at a right angle to a line through the source of radiations and the center of the loop.

In accordance with my present invention I provide a navigating instrument in which are combined the features of the two described devices, whereby there is produced a combined indication which denotes the heading of the aircraft with respect to a source of radiations, the position of the aircraft with respect to a defined course toward the source of radiations and the drift of the aircraft with respect to such course.

Referring to the drawing, in which there is illustrated an instrument formed and operable in accordance with the present invention, it will be seen that there is provided a casing 1 which is divided into a large lower chamber and a smaller upper chamber by a horizontal partition 2. Within the lower chamber there is mounted a gyroscope assembly including the rotor element 3, the same being mounted for universal movement in gimbal rings 4, and being operated by the impingement of a jet of air upon buckets 5 formed in the periphery thereof. The upper portion of the gimbal ring assembly is supported in the partition 2 by a shaft 6 which is attached at its lower end to one of the gimbal rings and extends upwardly through the partition into the upper chamber, terminating therein. In accordance with usual practise in the art the gyro chamber is maintained under a partial vacuum by suitable means, and the upper chamber of the device is therefore under a vacuum. The upper chamber is closed by a glass cover 8 which is mounted in an annular support 9 which is connected to the casing by a hinge 11 and which may be locked to the casing by means 12. The aperture formed by the annular member 9 is of such size that the entire upper chamber is visible therethrough. The glass cover 8 which closes this aperture is marked with a plurality of spaced, parallel lines 13 which extend in parallelism to the longitudinal axis of the aircraft when the instrument is positioned therein. A sealing gasket 7 is provided between the cover and the casing in order to maintain the vacuum within the casing.

Mounted on the upper end of shaft 6 and disposed within the upper chamber is the orientator device which is caused, by the gyroscope means upon which it is mounted, to assume and maintain a definite relation to the earth's surface. This device comprises a plate 14 which is attached to the upper end of shaft 6 in any desired manner but is preferably attached thereto by screw attachment to other supporting members which are directly attached to the shaft. One of the screws 15 which attach these parts together may be so positioned that its end extends above the upper surface of the plate 14, as illustrated in Fig. 2, for a purpose to be described hereinafter.

The plate 14 of the orientator device is adapted to have positioned thereon a map or chart 16 representing any desired portion of the surface of the earth and on which, and preferably located at the center thereof is represented the location of a radio beacon or broadcasting station to which the automatic direction finder carried by the aircraft is tuned and which is located at the center of the area represented on the chart. The chart illustrated in Fig. 1 is centered about the location of a radio range beacon having four courses which are represented on the chart, and this chart is selected and positioned on the plate 14 when it is desired to navigate the aircraft toward the location of the beacon which is represented. The end of shaft 6 is extended above the upper surface of the plate 14 and the map is provided with an aperture at its center and a second aperture displaced from the center, whereby it may be positioned on the plate by locating the shaft and screw 15 in these apertures. It will be apparent that the location of the selected source of radiations need not be at the center of the chart, although this is the preferred location.

It will be seen that if a map representing that part of the earth's surface over which the aircraft is to be navigated is positioned on the plate 14 and the gyroscope set to a proper heading by reference to a magnetic compass and then operated, the map will be maintained in correct orientation and position with respect to the earth's surface regardless of the maneuvers of the aircraft. The pilot will therefore have before him at all times a representation of the earth over which he is flying, and which will be aligned and properly positioned with respect to the earth. It will also be seen that the heading lines 13 will appear superimposed on the map and, inasmuch as these represent the heading of the aircraft, an indication thereof with respect to the surface of the earth represented on the chart will be constantly provided.

Means are provided by the invention which cooperate with the above-described means to produce a constant indication of the heading and course of the aircraft with respect to the source of radiations represented at the center of the chart which is positioned in the manner described, and to also produce a constant indication of the position of the aircraft with respect to a predetermined course which is marked on the map. Such means comprise an indicator 20 which is disposed outside of and adjacent the periphery of the plate 14 and which is carried by a ring 21 which is disposed below such plate and concentric therewith. This ring is preferably supported in an annular channel 22 which is mounted on the upper surface of the partition 2 and the lateral walls of which prevent undesired lateral movement of the ring 21, while permitting rotary movement thereof. An annular gear 23 is attached to the outer periphery of the ring 21, or is formed integrally therewith, and transmits rotary movement to such ring in a manner to be described. A semi-circular shield 24 is attached to the casing 1 and extends into close proximity to the periphery of the ring 21 in order to prevent dust and water from reaching the lower part of the upper casing.

While the indicating device illustrated in the drawing constitutes the preferred form thereof, other forms may be employed without departing in any way from the scope of the invention. For example, a transparent plate mounted above the chart and having an indicating line marked thereon may be employed, such plate being operated in the same manner as the indicator 20 which is disclosed in this application.

Means are provided by the invention for causing the indicator 20 to move about the periphery of the plate 14 and any map positioned thereon, and to constantly assume a position which is in direct alignment with a selected source of radiations and the representation of that source at the center of the map which is positioned in the device in the manner described. Such means comprise a connection between the rotatable loop 30 of an automatic direction finder device 31 and the indicator 20, and such connection may be made by means of flexible shafting 32 having a bevel gear 33 connected to one end thereof and meshing with the ring gear 23, and having at its other end suitable gearing 34 through which it is connected to the rotatable direction finder loop. As stated hereinbefore, if the automatic direction finder device is tuned to a source of radiations such as a broadcasting station, the loop thereof will be constantly and automatically maintained in a predetermined relation to the source and, if the aircraft carrying the direction finder device is moving, the position of the loop with respect to the aircraft will be constantly changed in order to maintain such predetermined relation. This movement will be transmitted through the flexible shaft and gearing to the ring 21 and the attached indicator 20, thereby causing the same to move about the periphery of the map or chart as the direction finder loop rotates, thus constantly indicating the line of position of the aircraft with respect to the source of received radiations. It will be apparent that by proper initial setting of the indicator with respect to the loop the indicator and the loop will be caused to maintain the same constant relation to the source of radiations.

An azimuth scale 35 is provided and is preferably marked on the cover in concentric, surrounding relation to the chart, and the indicator 20 is therefore located in the annular space between the outer periphery of the chart and the inner periphery of the scale. The scale, which is fixed to the aircraft, may be a 360° scale extending from a zero indication which is in the longitudinal axis of the aircraft or, as illustrated in Fig. 1, may be constituted by two 180° scales extending in two directions from such a zero indication. This azimuth scale is particularly useful in determining the position of the aircraft with an instrument such as that described in my copending application Serial No. 212,575, filed June 8, 1938. In such use of my present invention, the automatic direction finder device 31 may be tuned successively to different sources of radiations, thereby causing the indicator 20 to be moved by the operation of the direction finder loop into alignment with each source as it is received. The position assumed by the indicator in each case will indicate on the azimuth scale the bearing of the received source with respect to the longitudinal axis of the aircraft, and a plurality of these bearings may be plotted in a well-known manner in order to determine the position or location of the aircraft.

In the use and operation of the described device, it may be assumed that a flight is to be made from Richmond, Virginia, to Washington, D. C. It is first necessary to select the proper chart, this being one having at its center the location of a source of radiations which is located at or near the destination. This chart is positioned on the plate 14, the gyro being caged in the usual manner during the positioning of the chart. When the chart has been positioned, the cover of the upper casing is closed, the gyro is set to the heading of the magnetic compass and the caging knob is released to start the operation of the gyro. By periodic adjustment of the gyroscope, the chart may be maintained, during the entire flight and regardless of the maneuvering of the aircraft, in a position in which the representations on the map are aligned and properly oriented with the corresponding features of the earth's surface. The automatic direction finder is now tuned to receive radiations from the source which is represented at the center of the chart and, upon such tuning, the directional antenna of the direction finder will be moved to assume a predetermined position or relation to the source, which position will be maintained during the entire flight and so long as the direction finder is tuned to the selected station. The movement of the antenna will cause the indicator 20 to be moved about the periphery of the map to assume a definite position with respect to the source of radiations, which position will be maintained by the automatic operation of the antenna as the aircraft moves.

It will be seen that the indicator 20, the center of the chart 1 and the source of radiations will all lie on a common line. This will be apparent by reason of the fact that the chart is so positioned that the points or features represented thereon correspond in position and relation to the similar points on the part of the earth's surface represented by the chart, while the indicator is constantly maintained in a definite position or relation with respect to the source of radiations and, therefore, with respect to the representation thereof on the chart. The lines 13 which are viewed as superimposed on the chart denote the heading of the aircraft over the area represented on the chart. By navigating the aircraft in such a manner that the indicator 20 coincides with the center heading line 13a, the heading and track of the aircraft will be directly toward the source of radiations denoted at the center of the chart and therefore toward the predetermined destination.

The relation of the parts and indications as represented in Fig. 1 shows that the aircraft is heading directly toward the source and is east of the south leg A of the range beacon. If the indicator 20 were in the position B, as illustrated in Fig. 1, a line drawn through the center of the indicator and the center of the chart would indicate the direction of the source of received radiations, i. e. the destination. It would then be apparent that in order to reach the destination the direction of flight of the aircraft would have to be directed to the left. Such navigation would cause the heading lines to move over the chart and this movement would be continued until the lines coincided with the line extending through the center of the indicator 20 and the center of the chart, in which position the aircraft would be headed directly toward the source of radiations.

The instrument provided by this invention may be utilized in many ways to provide various indications and results not heretofore readily obtainable with known aircraft instruments. Among these various uses of the device are the following:

1. To automatically provide an indication of the drift of the aircraft with respect to a predetermined course. The manner in which this indication is provided will be apparent from a consideration of the indications represented in Fig. 1. If the original navigation of the aircraft has been along the leg A of the range beacon, then the line of position represented in Fig. 1, i. e. the line through the indicator 20 and the center of the chart, shows that the aircraft has drifted to the east of the course and that it must be given a more westerly heading in order to keep it on course.

2. To give lines of position of radio beacons or broadcasting stations located at various angles to the heading of the aircraft, thereby making it possible to obtain a "fix" and determine the position of the aircraft with respect to the earth's surface. This may be effected by tuning in various stations, noting their angular relation to the heading of the aircraft by reference to azimuth scale 35, and using these lines of position of the radio sources to determine position by triangulation, using some device such as that described in my aforesaid copending application for purposes of convenience.

3. To indicate at all times the heading of the aircraft over that part of the earth's surface represented on the chart, this being effected by the lines 13.

4. To indicate at all times the track of the aircraft with respect to a course marked on the map. This is illustrated in Fig. 1 by the position of the center heading line 13a with respect to the leg A of the range beacon.

5. In the event that the aircraft is not heading directly at the station represented at the center of the chart, to provide a line of position through the station and over the chart, on which line the aircraft is located at any instant, thus providing an indication of the general area in which the aircraft is located.

6. To constantly provide an indication of the orientation of the aircraft with respect to the surface of the earth, this being effected by reason of the fact that the map is constantly maintained in a fixed and aligned relation to that part of the earth's surface represented thereon.

While I have illustrated and described but one form which my invention may take, it will be apparent to those skilled in the art that various modifications, changes and improvements may be made, all without departing in any way from the spirit or scope of the invention, for the limits of which reference must be had to the appended claims.

What I claim is:

1. An instrument for use in navigating a mobile craft, comprising a chart representing a portion of the surface of the earth and having indicated thereon the location of a source of radiations which is located within the area represented on the chart, means for maintaining said chart in properly oriented position and relation with respect to the portion of the earth's surface represented thereon, a fixed scale surrounding said chart and extending for 180° in two directions from a zero indication which is in the longitudinal axis of the craft, an indicating means mounted between the outer periphery of said chart and the inner periphery of said scale and means for maintaining said indicator in alignment with the source of radiations and with the representation thereof on said chart.

2. A navigating instrument for use on a mobile craft, comprising a circular chart of a portion of the earth's surface having as its center the location of a source of radiations which is located at the center of the portion of the earth's surface represented on the chart, said chart being supported at its center for free movement thereabout, means operable to constantly maintain said chart in properly oriented position and relation with respect to the portion of the earth's surface represented thereon, an indicator device positioned entirely radially outside of the periphery of said chart and mounted for movement about the entire periphery thereof, and means constantly operable to maintain said indicator device in such position about the periphery of said chart that it is aligned with the source of radiations located on the surface of the earth and the representation thereof at the center of the chart.

3. A navigating instrument according to claim 2, comprising in addition an annular ring mounted beneath and concentrically with said chart for movement for through 360° about its center, said indicator device being attached to said ring.

4. A navigating instrument according to claim 2, in which the connection between the indicator device and the last-named means is provided by an annular ring mounted beneath and concentrically with said chart for movement through 360° about its center and on which said indicator device is mounted, said last-named means being connected and operable to cause movement of said ring about its center.

5. A navigating instrument according to claim 2, in which said last-named means comprise a device carried by the mobile craft and operable as the craft moves to maintain a constant fixed orientation with respect to the source of radiations represented at the center of the chart, and means connecting said device to said indicator device and operable to transmit to the indicator device the movement of said first-named device.

6. A navigating instrument according to claim 2, in which said last named means comprise a device carried by the craft and operable as the craft moves to maintain a constant orientation with respect to the source of radiations represented at the center of the chart, an annular ring mounted below and concentrically with said chart for movement about its center and on which said indicator device is mounted, and a gear connection between said first-named device and said ring.

HORACE STARK.